(12) United States Patent
Manral

(10) Patent No.: US 8,139,590 B2
(45) Date of Patent: Mar. 20, 2012

(54) OPTIMIZED POWER USAGE FOR DATA NETWORKS

(75) Inventor: Vishwas Manral, Sunnyvale, CA (US)

(73) Assignee: IP Infusion Inc., Sunnyvale, CA (US)

(*) Notice: Subject to any disclaimer, the term of this patent is extended or adjusted under 35 U.S.C. 154(b) by 277 days.

(21) Appl. No.: 12/636,615

(22) Filed: Dec. 11, 2009

(65) Prior Publication Data
US 2011/0142060 A1    Jun. 16, 2011

(51) Int. Cl.
*H04L 12/28* (2006.01)
(52) U.S. Cl. ...... 370/401; 370/331; 713/320; 455/127.1
(58) Field of Classification Search .................. None
See application file for complete search history.

(56) References Cited

U.S. PATENT DOCUMENTS

| 7,653,009 | B2 | 1/2010 | Watsen et al. | |
|---|---|---|---|---|
| 2009/0067335 | A1 | 3/2009 | Pelletier et al. | |
| 2009/0088097 | A1* | 4/2009 | Carballo | 455/127.1 |
| 2009/0109985 | A1* | 4/2009 | Yazaki et al. | 370/401 |
| 2009/0144568 | A1 | 6/2009 | Fung | |
| 2009/0252134 | A1 | 10/2009 | Schlicht et al. | |
| 2009/0285101 | A1 | 11/2009 | Lu | |
| 2010/0115306 | A1* | 5/2010 | Diab | 713/320 |

OTHER PUBLICATIONS

International Search Report and Written Opinion in International Application No. PCT/US10/59780, mailed Feb. 7, 2011.
K. Kompella et al., Network Working Group Request for Comments (RFC) 4206, "Label Switched Paths (LSP) Hierarchy with Generalized Multi-Protocol Label Switching (GMPLS) Traffic Engineering (TE)," Oct. 2005.
R. Aggarwal et al., Network Working Group Request for Comments (RFC) 4875, "Extensions to Resource Reservation Protocol—Traffic Engineering (RSVP-TE) for Point-to-Multipoint TE Label Switched Paths (LSPs)", May 2007.
D. Katz et al., Network Working Group Request for Comments (RFC) 3630, "Traffic Engineering (TE) Extensions to OSPF Version 2", Sep. 2003.
E. Rosen et al., Network Working Group Request for Comments (RFC) 3031, "Multiprotocol Label Switching Architecture", Jan. 2001.
D. Awduche et al., Network Working Group Request for Comments (RFC) 2702, "Requirements for Traffic Engineering Over MPLS", Sep. 1999.

* cited by examiner

*Primary Examiner* — Duc C Ho
(74) *Attorney, Agent, or Firm* — Nixon Peabody LLP

(57) ABSTRACT

A solution for optimized power usage for a data network includes, at a network device coupled to a network, examining traffic usage information of the network and power usage information of a plurality of routers in the network, and calculating a path from a first router of the network to a second router of the network based at least in part on the traffic usage information and the power usage information. The calculated path has relatively low aggregate power usage for routers comprising the path. The solution also includes storing an indication of whether one or more of the plurality of network routers may be placed in a power conservation mode based at least in part on the calculating.

22 Claims, 5 Drawing Sheets

OPTIMIZED POWER USAGE FOR DATA NETWORKS

TECHNICAL FIELD

The present disclosure relates to optimized power usage for data networks.

BACKGROUND

In packet switching networks, a connectionless network is a data network in which each data packet carries information in a header that contains a destination address sufficient to permit the independent delivery of the packet to its destination via the network. In a connection-oriented network, the communicating peers must first establish a logical or physical data channel or connection in a dialog preceding the exchange of user data.

A connectionless network has an advantage over a connection-oriented mode in that it has low overhead. It also allows for multicast and broadcast operations, which may save even more network resources when the same data needs to be transmitted to several recipients. In contrast, a connection is always unicast (point-to-point).

A router is a network device configured to route and forward information contained in network packets to another network device. Data networks are highly meshed to provide redundancy. This redundancy means there are multiple routers and multiple paths through the network to get a data packet from a source to a destination.

Multi Protocol Label Switching (MPLS) is a scheme typically used to enhance an Internet Protocol (IP) network. Routers on the incoming edge of the MPLS network add an 'MPLS label' to the top of each packet. This label is based on some criteria (e.g. destination IP address) and is then used to steer it through the subsequent routers. The routers on the outgoing edge strip it off before final delivery of the original packet. MPLS can be used for various benefits such as multiple types of traffic coexisting on the same network, ease of traffic management, faster restoration after a failure, and, potentially, higher performance.

RSVP (Resource Reservation Protocol), also known as Resource Reservation Setup Protocol is protocol that supports the reservation of resources across an IP network. Applications running on IP end systems can use RSVP to indicate to other nodes the nature (bandwidth, jitter, maximum burst, and so on) of the packet streams they want to receive.

Networking providers such as Nippon Telegraph and Telephone Corporation (NTT) operate one of the largest collections of electrical equipment in the world. NTT is estimated to consume approximately 8.5% of the total power in the Tokyo Metropolitan area. According to some estimates, 15% of all operational expenditures are power-related.

The amount of electrical equipment used by networking providers is due in part to over provisioned networks and additional hardware used for High-Availability requirements. Current network-level optimization solutions focus on bandwidth and quality of service considerations. Additionally, solutions exist for optimizing power usage at an individual network device level (e.g. switch or router). However, these solutions fail to address power usage of an entire network. Accordingly, an improved solution for power usage for data networks would be desirable.

SUMMARY OF THE INVENTION

A solution for optimized power usage for a data network includes, at a network device coupled to a network, examining traffic usage information of the network and power usage information of a plurality of routers in the network, and calculating a path from a first router of the network to a second router of the network based at least in part on the traffic usage information and the power usage information. The calculated path has relatively low aggregate power usage for routers comprising the path. The solution also includes storing an indication of whether one or more of the plurality of network routers may be placed in a power conservation mode based at least in part on the calculating.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
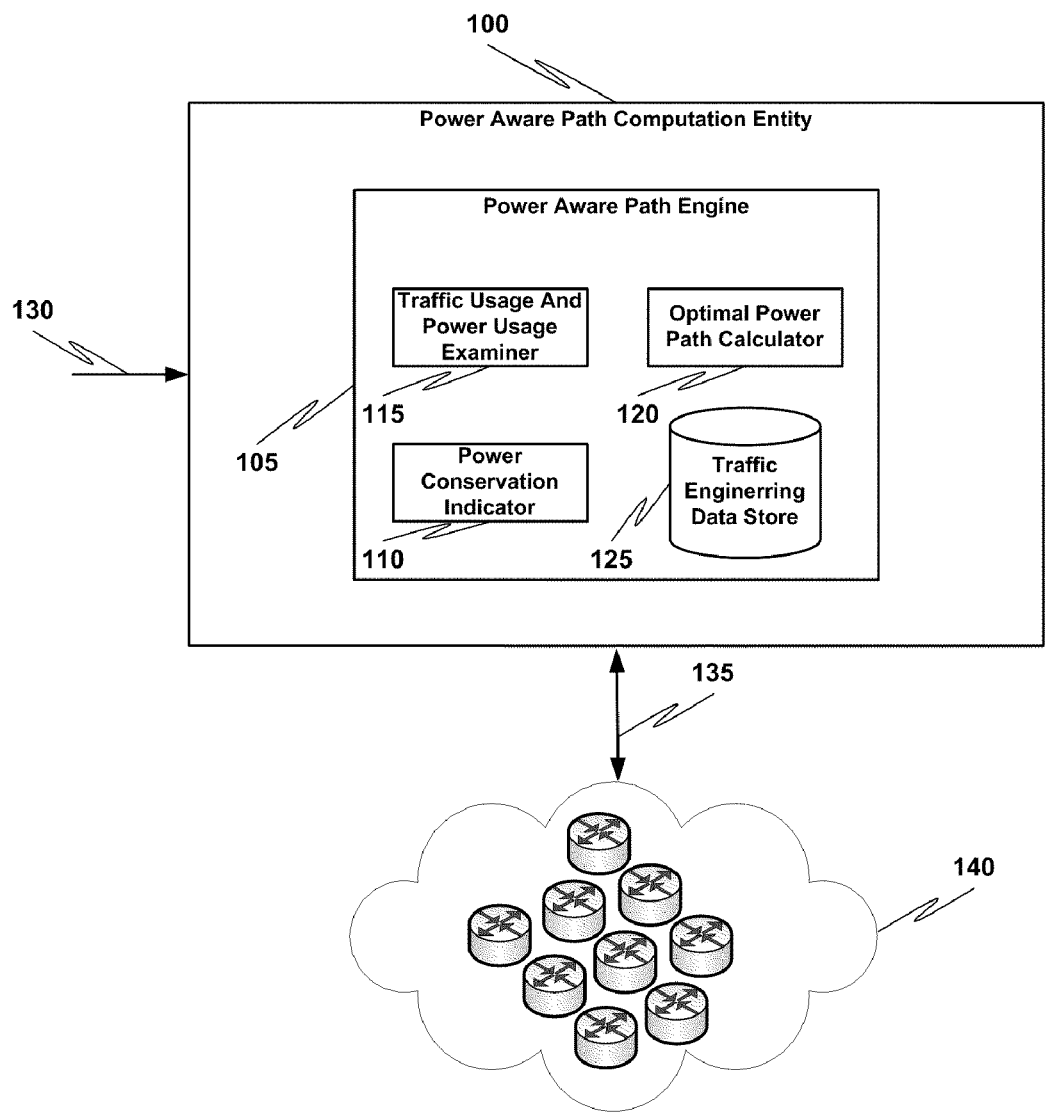
FIG. 1 is a block diagram that illustrates a system for optimized power usage for data networks in accordance with one embodiment.

Embodiments of the present invention are described herein in the context of optimized power usage for data networks. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general-purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes local area networks (LANs), wide area networks (WANs), metro area networks, residential networks, corporate networks, inter-networks, the Internet, the World Wide Web, cable television systems, telephone systems, wireless telecommunications systems, fiber optic networks, token ring networks, Ethernet networks, ATM networks, frame relay networks, satellite communications systems, and the like. Such networks are well known in the art and consequently are not further described here.

In the context of the present invention, the term "identifier" describes an ordered series of one or more numbers, characters, symbols, or the like. More generally, an "identifier" describes any entity that can be represented by one or more bits.

In the context of the present invention, the term "distributed" describes a digital information system dispersed over multiple computers and not centralized at a single location.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

In the context of the present invention, the term "network interface" describes the means by which users access a network for the purposes of communicating across it or retrieving information from it.

In the context of the present invention, the term "system" describes any computer information and/or control device, devices or network of devices, of hardware and/or software, comprising processor means, data storage means, program means, and/or user interface means, which is adapted to communicate with the embodiments of the present invention, via one or more data networks or connections, and is adapted for use in conjunction with the embodiments of the present invention.

It should be noted that the optimized power usage for data networks system is illustrated and discussed herein as having various modules which perform particular functions and interact with one another. It should be understood that these modules are merely segregated based on their function for the sake of description and represent computer hardware and/or executable software code which is stored on a computer-readable medium for execution by appropriate computing hardware. The various functions of the different modules and units can be combined or segregated as hardware and/or software stored on a computer-readable medium as above as modules in any manner, and can be used separately or in combination.

In example embodiments of the present invention, power usage characteristics of network components are used to determine how to redirect network traffic so as to make more energy-efficient utilization of the network components. Network components that are not required to maintain a minimum level of availability and redundancy may be placed in a power conservation mode during times of lean data traffic, reducing power consumption of the network as a whole.

FIG. 1 is a block diagram that illustrates a system for optimized power usage for data networks in accordance with one embodiment. As shown in FIG. 1, a system for optimized power usage for data networks includes a power aware path computation entity 100 coupled to a network 140. The power aware path computation entity 100 comprises a power aware path engine 105. The power aware path engine 105 includes a traffic usage and power usage examiner 115, an optimal power path calculator 120, a power conservation indicator 110, and a traffic engineering data store 125.

Traffic usage and power usage examiner 115 is configured to examine traffic usage information of network 140 and power usage information of routers in the network 140. The traffic usage information and the power usage information may be stored in traffic engineering data store 125.

Routers in network 140 are configured to advertise or send link- and router-level power characteristics to power aware path computation entity 100. According to one embodiment, OSPF-TE (Open Shortest Path First-Traffic Engineering) is used to disseminate a routers' link- and router-level power characteristics. According to one embodiment, traffic usage and power usage examiner 115 is configured to examine power usage information in an OSPF-TE LSA (Link State Advertisement).

Example power usage information may include an indication of a network device power usage, and an indication of known down times. If the power usage of the network device depends upon a configuration of the network device, the power usage information may indicate power usage for each configuration.

Still referring to FIG. 1, the traffic engineering data store 125 is examined by the power aware path engine 105. In one embodiment, the power aware path engine 105 resides within at power aware path computation entity 100. Power aware path computation entity is a network device that may include components in addition to power aware path engine 105. In another embodiment, the power aware path engine 105 resides within an ingress label edge router (reference numeral 310 of FIG. 3).

Optimal power path calculator 120 is configured to calculate a path from a first router of the network 140 to a second router of the network 140 based at least in part on the traffic usage information and the power usage information, where the calculated path has a relatively low aggregate power usage for routers comprising the path. The calculation may be based at least in part on a required level of service or a required level of routing redundancy.

Power conservation indicator 110 is configured to store an indication of whether one or more of the network routers may be placed in a power conservation mode based at least in part on the calculating. A power conservation mode is any state of the one or more network routers that uses less power than when the one or more network routers are operating as routers. A power conservation mode may include a fully off mode, a standby mode, and a mode whereby some but not all components of the router are powered.

According to one embodiment, the network device is configured to notify the plurality of network routers of the path. For example, the network device may notify the plurality of network routers of the path using a Resource Reservation Protocol (RSVP). According to one embodiment, the notifying further comprises using a Make Before Break (MBB) handoff to avoid dropping data.

According to one embodiment, traffic engineering data store 125 receives information on traffic usage of the network in real-time. This information can then be used by the power aware path engine 105 to configure traffic paths for data traffic over the network 140. When the network traffic utilization changes, the data paths are optimized and the network routers are notified of the paths, for example by using an MBB handoff feature of RSVP-TE.

During periods of low or sub-optimal link utilization, traffic on the link is switched to another link (if one exists) that is better utilizing the power resources and the network bandwidth. There are devices in the network which will automatically go to a power conservation mode when no data traffic passes through them. By rerouting the data traffic, power on such links can be saved. Other devices that do not automatically go to a power conservation mode when no traffic passes through them may be commanded into a power conservation mode.

As the peak hour traffic in a network is often for only a few hours each day, power utilization can be optimized for the other hours, thus reducing energy costs for service providers.

According to one embodiment, the calculating further comprises modifying one or more Open Shortest Path First (OSPF) interface costs based at least in part on the power usage information. The power aware path engine 105 is configured to, responsive to the calculating, redirect traffic away from a link using an OSPF stub link advertisement, and redirect traffic away from a router using a stub router advertisement.

Figure 2:
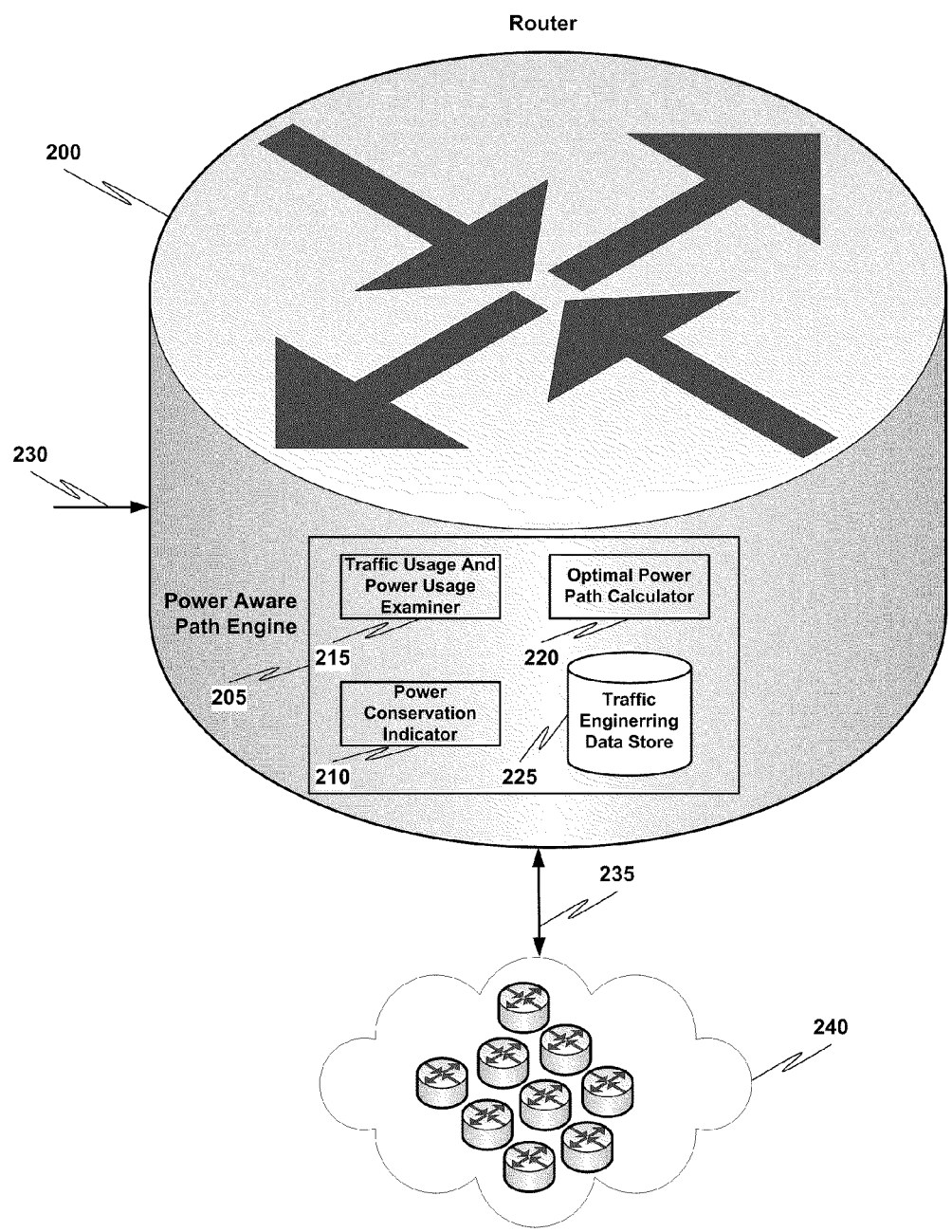
FIG. 2 is a block diagram that illustrates a system for optimized power usage for data networks in accordance with one embodiment.

FIG. 2 is a block diagram that illustrates a system for optimized power usage for data networks in accordance with one embodiment. FIG. 2 provides more detail for FIG. 1, where the power aware path computation entity 100 of FIG. 1 is a network device configured to perform a network routing functionality. Router 200 may comprise an ingress interface of network 240.

Figure 3:
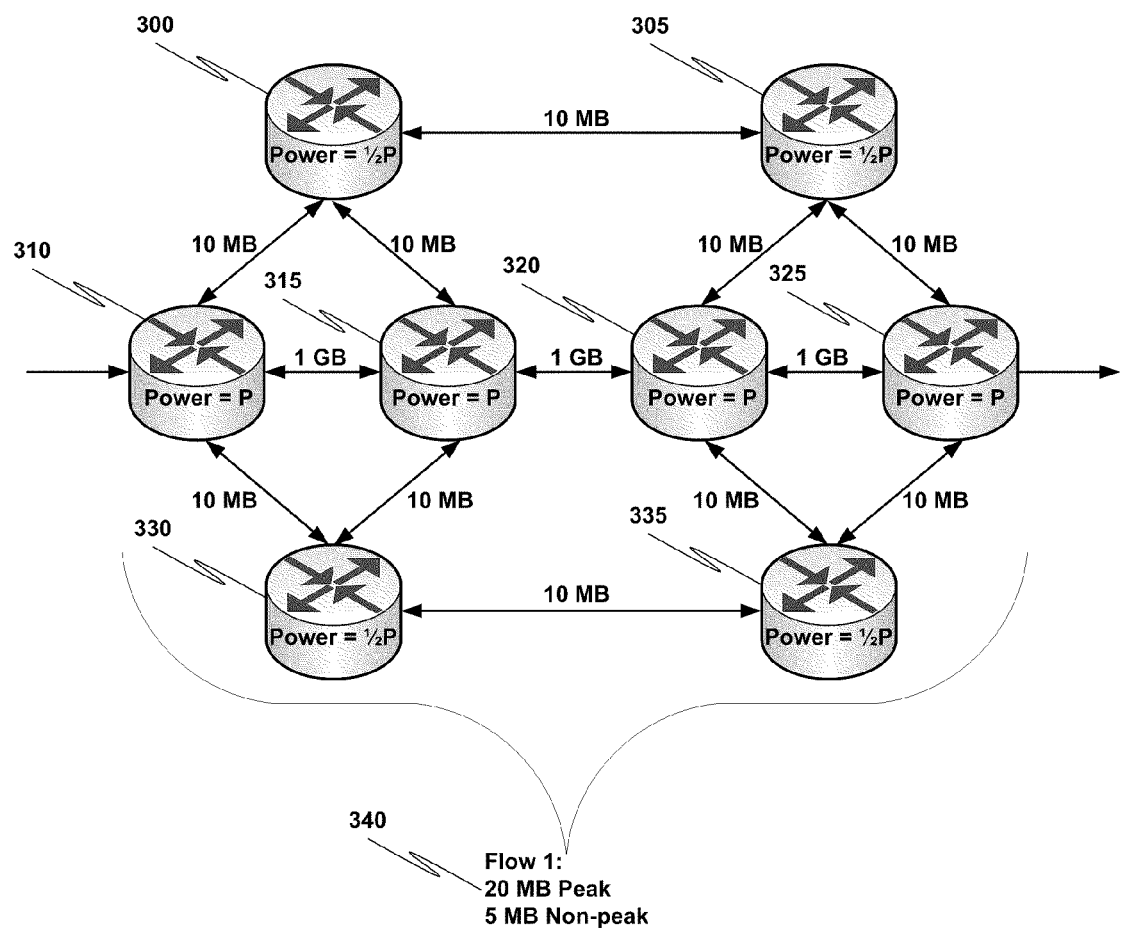
FIG. 3 is a block diagram that illustrates calculating an optimal path in a system for optimized power usage for data networks in accordance with one embodiment.

FIG. 3 is a block diagram that illustrates calculating an optimal path in a system for optimized power usage for data networks in accordance with one embodiment. In the example illustrated in FIG. 3, the bandwidth of the links between the following routers is 1 GB:

router 310 and router 315
router 315 and router 320
router 320 and router 325

Additionally, the all other link bandwidths in FIG. 3 are 10 MB. Also shown in FIG. 3, the power usage (P) of routers of each of 310, 315, 320, and 325 is twice that of each of routers 300, 305, 330, and 335.

FIG. 3 assumes flow 1 (340) from the ingress interface of router 310 to the egress interface of router 325 uses 20 MB at peak time and 5 MB at other times.

In current networks (without Power Awareness), the network of FIG. 3 would have flows running over all the links illustrated in the figure. Flow 1 (340) would always be directed through the path router 310→router 315→router 320→router 325, as power is not a constraint in current networks and the maximum bandwidth usage is always used. The total power usage in current networks would be 4 P.

Still referring to FIG. 3, in embodiments of the present invention, during a lean traffic period such as if flow 1 is the only data traffic transiting the network, the data is directed through the path router 310→router 300→router 305→router 325 or the path router 310→router 330→router 335→router 325. For both of these paths, the total usage would be 3 P, resulting in a 25% power savings. Note the power usage could be 2.5 P if there was a link between router 300 and router 325, or between router 330 and router 325, resulting in a nearly 40% power savings.

According to one embodiment, at least one network component of a data network is not configured for optimized power usage. In this embodiment, a power aware path computation entity treats the at least one network component as though it has no power conservation mode and will consume power regardless of its use. As such, the path computation entity is configured to consider the "always-on" status of the at least one network component in path computations.

Figure 4:
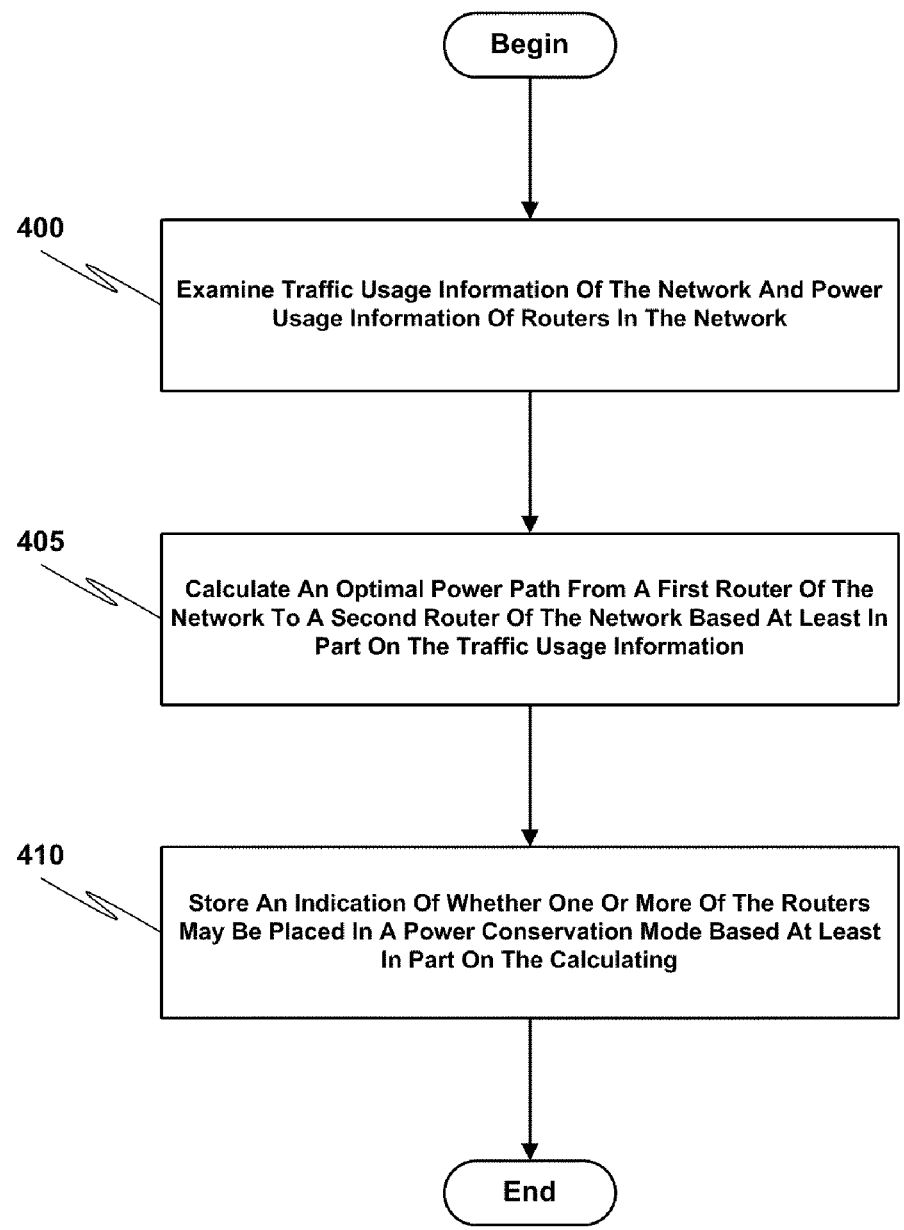
FIG. 4 is a block diagram that illustrates a method for optimized power usage for data networks in accordance with one embodiment.

FIG. 4 is a block diagram that illustrates a method for optimized power usage for data networks in accordance with one embodiment. The processes illustrated in FIG. 4 may be implemented in hardware, software, firmware, or a combination thereof. The processes illustrated in FIG. 4 may be implemented by a power aware path engine, such as power aware path engine 105 of FIG. 1 or power aware path engine 205 of FIG. 2. At 400, traffic usage information of the network and power usage information of routers in the network is examined. At 405, an optimal power path from a first router of the network to a second router of the network is calculated based at least in part on the traffic usage information. At 410, an indication of whether one or more of the routers may be placed in a power conservation mode is stored based at least in part on the calculating.

Embodiments of the invention may be applied to both connection-oriented networks and connectionless networks. In connection-oriented networks a path computation server may comprise a power aware path computation entity (reference numeral 100 of FIG. 1) which is configured to compute a path in the network based on a current state of the network (traffic, power usage, and the like).

In connectionless networks, the same effect (power-aware path computation) may be achieved by the network administrator configuring the costs of network links based on the desired network paths that optimize the power usage in the network. By way of example, a network administrator that is configuring a channel for a communication between points A and B may assign a relatively low cost to links having relatively low power usage; the network administrator may also assign a relatively high cost to links having relatively high power usage. The network administrator may then select a combination of links between A and B having a relatively low aggregate link cost, and configure the channel to use the selected combination of links.

Figure 5:
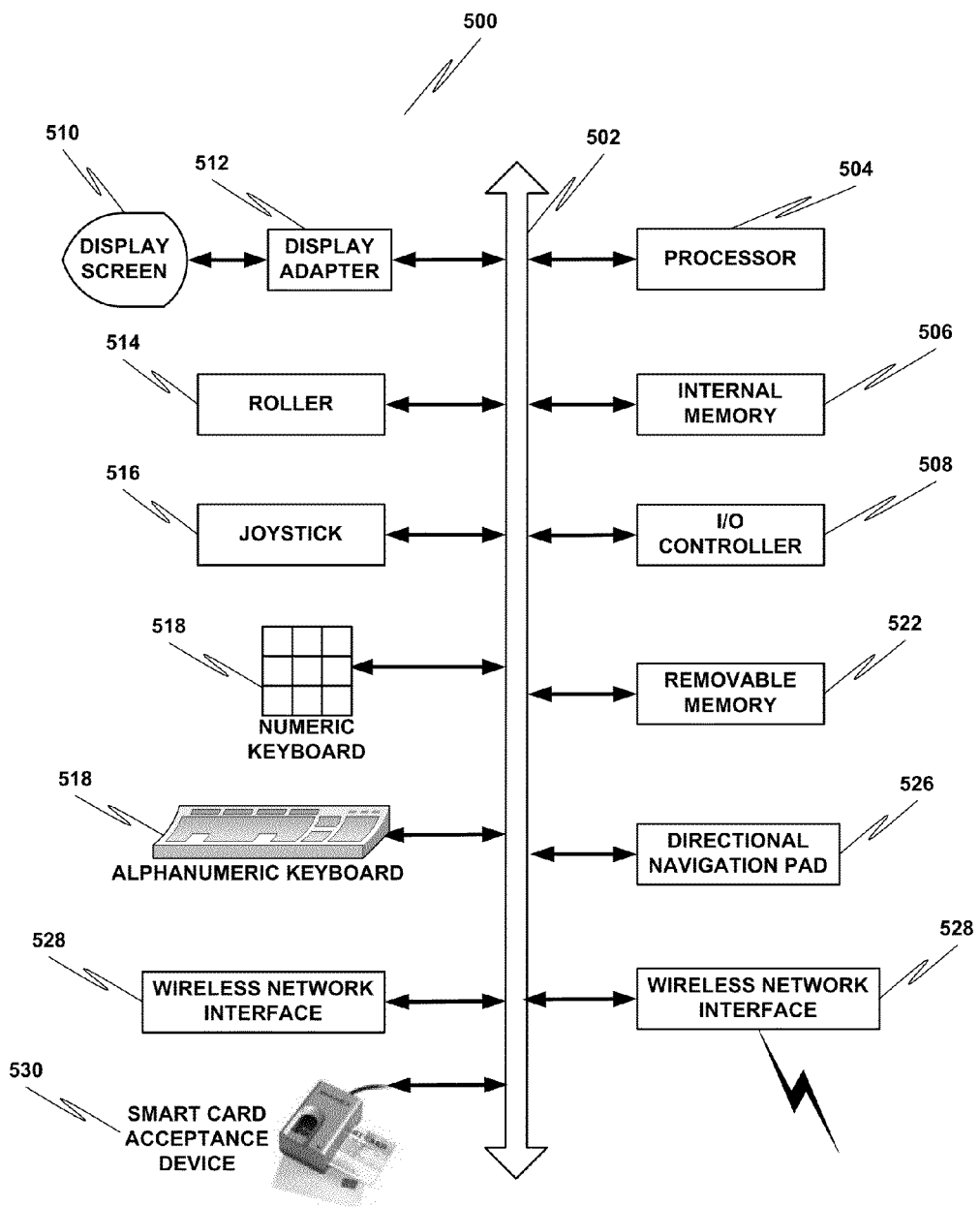
FIG. 5 is a block diagram of a computer system suitable for implementing aspects of the present disclosure.

FIG. 5 depicts a block diagram of a computer system 500 suitable for implementing aspects of the present invention. As shown in FIG. 5, system 500 includes a bus 502 which interconnects major subsystems such as a processor 504, an internal memory 506 (such as a RAM), an input/output (I/O) controller 508, a removable memory (such as a memory card) 522, an external device such as a display screen 510 via display adapter 512, a roller-type input device 514, a joystick 516, a numeric keyboard 518, an alphanumeric keyboard 518, directional navigation pad 526, smart card acceptance device 530, and a wireless interface 520. Many other devices can be connected. Wireless network interface 520, wired network interface 528, or both, may be used to interface to a local or wide area network (such as the Internet) using any network interface system known to those skilled in the art.

Many other devices or subsystems (not shown) may be connected in a similar manner. Also, it is not necessary for all of the devices shown in FIG. 5 to be present to practice the present invention. Furthermore, the devices and subsystems may be interconnected in different ways from that shown in FIG. 5. Code to implement the present invention may be operably disposed in internal memory 506 or stored on storage media such as removable memory 522, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory).

While embodiments of this invention have been shown and described in the context of MPLS networks, embodiments of the invention can be applied to other networks as well, for example Voice over Internet Protocol (VoIP) networks.

While embodiments of this invention have been shown and described in the context of a RSVP-TE protocol, embodiments of the invention can be applied to other signaling protocols as well, for example CR-LDP (Constraint-based Label Distribution Protocol).

While embodiments of this invention have been shown and described in the context of OSPF, embodiments of the invention can be applied to other protocols as well, for example an Intermediate System to Intermediate System (IS-IS) protocol. Furthermore, while embodiments of this invention have been shown and described in the context of OSPF-TE, embodiments of the invention can be applied to other protocols used to distribute information about routers as well, for example an Intermediate System to Intermediate System (IS-IS) protocol to support Traffic Engineering (TE).

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method comprising:
at a network device coupled to a network, examining traffic usage information of the network and power usage information of a plurality of routers in the network;
calculating a path from a first router of the network to a second router of the network based at least in part on the traffic usage information and the power usage information, the calculated path having relatively low aggregate power usage for routers comprising the path; and
storing an indication of whether one or more of the plurality of network routers may be placed in a power conservation mode based at least in part on the calculating.

2. The method of claim 1, further comprising notifying the plurality of network routers of the path.

3. The method of claim 2, further comprising notifying the plurality of network routers of the path using a Resource Reservation Protocol (RSVP).

4. The method of claim 3 wherein the notifying further comprises using a Make Before Break (MBB) handoff.

5. The method of claim 1 wherein the examining comprises examining power usage information in an OSPF-TE (Open Shortest Path First-Traffic Engineering) LSA (Link State Advertisement).

6. The method of claim 1 wherein the network device comprises an ingress label edge router (LER).

7. The method of claim 1 wherein the network device comprises a path computation entity (PCE).

8. The method of claim 1, further comprising:
periodically repeating the examining; and
if a change in the traffic usage information is indicated, repeating the calculating and the storing.

9. The method of claim 1 wherein the calculating further comprises modifying one or more Open Shortest Path First (OSPF) interface costs based at least in part on the power usage information.

10. The method of claim 9, further comprising:
responsive to the calculating,
redirecting traffic away from a link using an OSPF stub link advertisement; and
redirecting traffic away from a router using a stub router advertisement.

11. An apparatus comprising:
a memory; and
one or more processors configured to:
examine traffic usage information of a network and power usage information of a plurality of routers in the network;
calculate a path from a first router of the network to a second router of the network based at least in part on the traffic usage information and the power usage information, the calculated path having relatively low aggregate power usage for routers comprising the path; and
store an indication of whether one or more of the plurality of network routers may be placed in a power conservation mode based at least in part on the calculating.

12. The apparatus of claim 11 wherein the one or more processors are further configured to notify the plurality of network routers of the path.

13. The apparatus of claim 12 wherein the one or more processors are further configured to notify the plurality of network routers of the path using a Resource Reservation Protocol (RSVP).

14. The apparatus of claim 13 wherein the notifying further comprises using a Make Before Break (MBB) handoff.

15. The apparatus of claim 11 wherein the one or more processors are further configured to examine power usage information in an OSPF-TE (Open Shortest Path First-Traffic Engineering) LSA (Link State Advertisement).

16. The apparatus of claim 11 wherein the network device comprises an ingress label edge router (LER).

17. The apparatus of claim 11 wherein the network device comprises a path computation entity (PCE).

18. The apparatus of claim 11 wherein the one or more processors are further configured to:
   periodically repeat the examining; and
   if a change in the traffic usage information is indicated, repeat the calculating and the storing.

19. The apparatus of claim 11 wherein the calculating further comprises modifying one or more Open Shortest Path First (OSPF) interface costs based at least in part on the power usage information.

20. The apparatus of claim 19 wherein the one or more processors are further configured to:
   responsive to the calculating,
      redirect traffic away from a link using an OSPF stub link advertisement; and
      redirect traffic away from a router using a stub router advertisement.

21. An apparatus comprising:
   means for, at a network device coupled to a network, examining traffic usage information of the network and power usage information of a plurality of routers in the network;
   means for calculating a path from a first router of the network to a second router of the network based at least in part on the traffic usage information and the power usage information, the calculated path having relatively low aggregate power usage for routers comprising the path; and
   means for storing an indication of whether one or more of the plurality of network routers may be placed in a power conservation mode based at least in part on the calculating.

22. A program storage device readable by a machine, embodying a program of instructions executable by the machine to perform a method, the method comprising:
   at a network device coupled to a network, examining traffic usage information of the network and power usage information of a plurality of routers in the network;
   calculating a path from a first router of the network to a second router of the network based at least in part on the traffic usage information and the power usage information, the calculated path having relatively low aggregate power usage for routers comprising the path; and
   storing an indication of whether one or more of the plurality of network routers may be placed in a power conservation mode based at least in part on the calculating.

* * * * *